Dec. 14, 1965  V. N. TRAMONTINI  3,223,151
THERMOSTATICALLY CONTROLLED HEAT EXCHANGER
Original Filed June 2, 1961
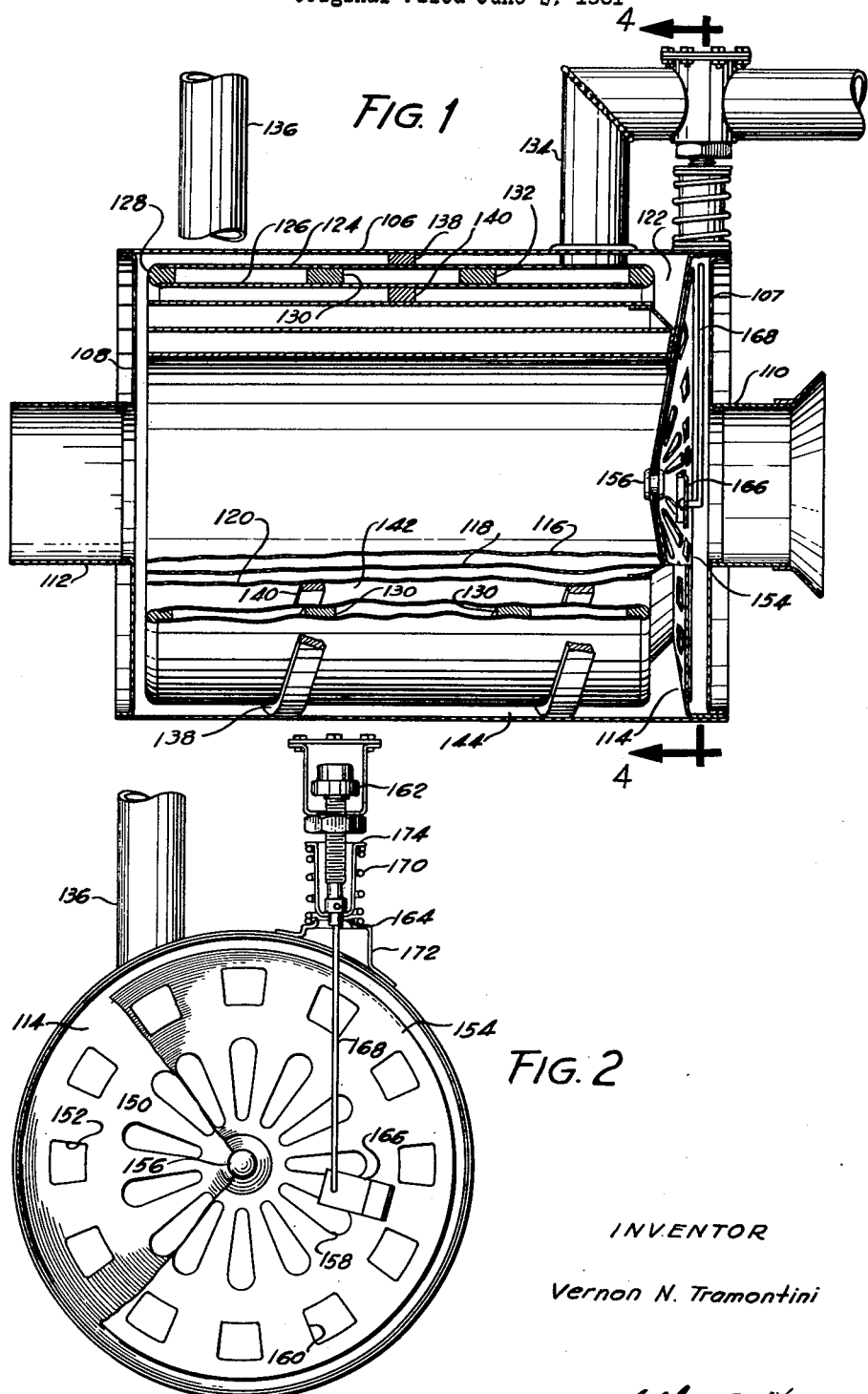
INVENTOR
Vernon N. Tramontini
By
Attorney United States Patent Office 3,223,151
Patented Dec. 14, 1965

3,223,151
THERMOSTATICALLY CONTROLLED HEAT
EXCHANGER
Vernon N. Tramontini, Indianapolis, Ind., assignor to Stewart-Warner Corporation, Chicago, Ill., a corporation of Virginia
Application Mar. 19, 1962, Ser. No. 181,237, which is a division of application Ser. No. 114,501, June 2, 1961. Divided and this application Jan. 8, 1965, Ser. No. 424,334
3 Claims. (Cl. 165—39)

This application is a division of copending application Serial No. 181,237, filed March 19, 1962, which was a division of the parent application Serial No. 114,501, filed June 2, 1961, now abandoned.

This invention relates to heating apparatus and is more particularly concerned with, but not limited to, heating equipment for automobiles and similar vehicles.

In present automotive practice the passenger compartment of a vehicle is frequently heated by means of a liquid coolant radiator to which engine heat is transferred in some manner and distributed by air passing into the vehicle body. In automobiles having water cooled engines the radiator is most frequently connected to the engine cooling system so as to receive a supply of hot water from the water jacket of the internal combustion engine.

With this type of arrangement the radiator unit is ineffective until the temperature of the water in the jacket of the engine has been raised by operation of the engine itself. When the vehicle has been standing in the open or in an unheated garage for an appreciable length of time in cold weather, the water in the engine cooling system is at a low temperature and some little time is required to bring the water to a sufficiently high temperature to enable the radiator units to function. Most automobile cooling systems include thermostatic controls which prevent some or all of the cooling water from circulating through the automobile cooling radiator until the temperature in the water jacket has reached a predetermined minimum value. The thermostatic control shortens the time required to bring the engine itself to normal operating condition and also the time required to raise the water in the circulatory system to a sufficiently high temperature so that the radiating unit for the vehicle body will begin to give off heat to the passenger compartment. However, even with the best present installations a very appreciable period of time is required before the engine water warms sufficiently to commence supplying heat to the passenger compartment heater if the automobile and its cooling system are thoroughly chilled at the time the engine is started.

It is an object of this invention to provide a novel preheater unit which is especially adapted for use with a system of the type hereinbefore described. A heat exchanger unit is provided in which the heat from the exhaust gases is transferred to the radiator liquid coolant medium. A by-pass conduit is also provided through the unit which is rendered effective by a thermostatically controlled valve means to shunt the gases around the heat transfer means when the liquid coolant attains a sufficient temperature level. The by-pass is constructed to present a minimum resistance to gas flow so that the preheater unit does not materially affect the operating efficiency of the engine during normal operating conditions.

It is also an object of this invention to provide a preheater unit which may be economically fabricated and easily installed in existing heating systems.

Other objects and advantages of this invention will become readily apparent upon a further reading of this specification, especially when taken in view of the accompanying drawings in which:

FIG. 1 is an elevation view, partially in section, of a heat exchanger embodying this invention; and FIG. 2 is a vertical section of the heat exchanger taken along line 4—4 of FIG. 3.

Reference is now made to FIGS. 1 and 2 for a description of a heat exchanger unit embodying the invention. This unit comprises a cylindrical housing 106 having closed ends 107 and 108 with an exhaust gas inlet 110 and outlet 112 passing therethrough respectively. Adjacent the inlet end of the housing 106 is a conically-shaped baffle 114 sealed to the interior wall of the housing 106. A tubular element 116 extends concentrically from the conical baffle 114, to which it is sealed, to a position adjacent the outlet end 108 of the housing 106. A second tubular element 118 surrounds the tubular element 116 which acts as a thermal shield to reduce heat radiation from exhaust gases passing through the interior of the tubular element 116. A third tubular element 120 surrounds the thermal shield 118 and is also sealed to the conical baffle 114 to form an annular chamber 122 with the inner wall of the cylindrical housing 106.

Within the chamber 122 is a cooling water conduit assembly comprising a pair of concentric cylinders 124 and 126 separated by end spacers 128 and a spiral spacer 130. An engine water coolant inlet 134 and outlet 136 are connected to the coolant water assembly and the spiral passage formed by the spacer 130 provides communications therebetween. The coolant conduit assembly is spaced within the chamber 122 by means of spiral spacers 138 and 140, respectively, which also serve to define spiral passages 142 and 144, respectively, on either side of the coolant conduit assembly for the exhaust gases passing through the annular chamber 120.

The conical baffle 114 has two series of circularly arranged apertures 150 and 152 (FIG. 4). The inner series of apertures 150 provides communication only to the interior of the tubular element 116 and the outer series of apertures 152 provide communication only to the annular chamber 122. A second conical baffle plate 116 is in telescopic engagement with the first baffle 114 and is rotatable with respect thereto by means of a mounting rivet 156 at the apices of the baffles 114 and 154. The conical baffle 154 also has an inner series of apertures 158 for communication with the interior of the tubular element 116 and an outer series of apertures 160 for communication with the annular chamber 122. The respective apertures in the inner and outer series, 158 and 160, in the rotatable baffle 154 are radially aligned whereas the respective apertures in the inner and outer series 150 and 152 in the stationary baffle 114 are alternately displaced, so that, in one rotational position of the baffle 154 with respect to the baffle 114 communication is provided for the exhaust gases from the inlet 110 to the interior of the tubular element 116, and in another rotational position communication is provided from the inlet to the annular chamber 122.

The rotational position of the conical baffle 154 is controlled by a thermostatic device 162, such as the one hereinbefore described, which has its linearly displaceable pin 164 connected to an arm 168 in linking engagement with a tab 166 secured to the baffle 154. A spring 170 compressed between a bracket 172 and an adaptor 174 fastened to pin 164 provides an upward biasing force to maintain the baffle 154 in a normal position wherein the outer series of apertures 160 and 152 are in alignment to pass the exhaust gases to the heat transfer annular chamber 122 when the engine and coolant water are cold. After the engine is run for a length of time, and the coolant is warmed to its normal operating temperature, the thermostatic device 162 provides a linear force through pin 164 and link 168 to rotate the baffle 154 and align the inner series of apertures 150 and 158 while disaligning the outer series 152 and 160.

In this heat exchanger the exhaust gases are passed directly through the unit with a minimum of obstruction under normal operating conditions when no heat transfer is desired. When heat is required during engine warm-ups the exhaust gases are conducted through efficient heat transfer passages wherein the fluid medium extracts heat.

There are numerous other features and advantages in the heat exchanger of this invention which may be readily adapted to other vehicle heaters. While a specific embodiment has been described as an example of the teachings of the invention, it is intended that the invention should not be bound thereby, but only by the proper scope of the appending claims.

What is claimed is:

1. A heat exchanger comprising a cylindrical housing, a conical baffle transversely fixed across the interior of said housing adjacent one end thereof, a tubular element having one end sealed to said conical baffle and concentrically extending to a position adjacent the other end of said housing to form an annular chamber with the inner wall of said housing, a thermal shield between said annular chamber and the interior passage of said tubular element, said conical baffle having a first plurality of angularly spaced apertures in communication with said annular chamber and a second plurality of angularly spaced apertures in communication with the interior passage of said tubular element, a second conical baffle in telescopic engagement with said first conical baffle and rotatably mounted at its axis, said second conical baffle having a first plurality of angularly spaced apertures alignable with the first plurality of apertures in said first conical baffle in at least one rotational position and a second plurality of angularly spaced apertures alignable with the second plurality of apertures in said first conical baffle in at least one other rotational position, linking means secured to said second conical baffle, spiral conduit means within said annular chamber, means for flowing a first fluid through said conduit means, thermostatic means connected to said linking means and said conduit means, operable responsive to the outlet temperature of said first fluid for rotating said second conduit baffle, inlet means for a second fluid at the one end of said housing adjacent said conical baffle, and outlet means for said second fluid in the other end of said housing in communication with said chamber and the interior passage of said tubular element.

2. A heat exchanger comprising a cylindrical housing, a conical baffle transversely fixed across the interior of said housing adjacent one end thereof, a tubular element having one end sealed to said conical baffle and concentrically extending to a position adjacent the other end of said housing to form an annular chamber with the inner wall of said housing, said conical baffle having a first plurality of angularly spaced apertures in communication with said annular chamber and a second plurality of angularly spaced apertures in communication with the interior passage of said tubular element, a sec-ond conical baffle in telescopic engagement with said first conical baffle and rotatably mounted at its axis, said second conical baffle having a first plurality of angularly spaced apertures alignable with the first plurality of apertures in said first conical baffle in at least one rotational position and a second plurality of angularly spaced apertures alignable with the second plurality of apertures in said first conical baffle in at least one other rotational position, linking means secured to said second conical baffle, conduit means within said annular chamber, means for flowing a first fluid through said conduit means, thermostatic means connected to said linking means and said conduit means, operable responsive to the outlet temperature of said first fluid for rotating said second conduit baffle, inlet means for a second fluid at the one end of said housing adjacent said conical baffle, and outlet means for said second fluid in the other end of said housing in communication with said chamber and the interior passage of said tubular element.

3. A heat exchanger comprising a cylindrical housing, a conical baffle transversely fixed across the interior of said housing adjacent one end thereof, a tubular element having one end sealed to said conical baffle and concentrically extending to a position adjacent the other end of said housing to form an annular chamber with the inner wall of said housing, said conical baffle having at least one aperture in communication with said annular chamber and at least one other aperture in communication with the interior passage of said tubular element, a second conical baffle in telescopic engagement with said first conical baffle and rotatably mounted at its axis, said second conical baffle having at least one aperture alignable with the first aperture in said first conical baffle in at least one rotational position and at least one other aperture alignable with said other aperture in said first conical baffle in at least one other rotational position, linking means secured to said second conical baffle, conduit means within said annular chamber, means for flowing a first fluid through said conduit means, thermostatic means connected to said linking means and said conduit means operable responsive to the outlet temperaure of said first fluid for rotating said second conduit baffle, inlet means for a second fluid at the one end of said housing adjacent said conical baffle, and outlet means for said second fluid in the other end of said housing in communication with said chamber and the interior passage of said tubular element.

References Cited by the Examiner

UNITED STATES PATENTS

| | | | |
|---|---|---|---|
| 1,806,530 | 5/1931 | Giesler | 236—93 |
| 1,870,809 | 8/1932 | Handy. | |
| 2,017,194 | 10/1935 | Zimmerman | 236—12 |
| 2,058,116 | 10/1936 | Zeni | 165—35 |
| 2,177,937 | 10/1939 | Goldschmidt | 236—34.5 |
| 2,670,933 | 3/1954 | Bay | 165—35 |
| 3,131,757 | 5/1964 | Bergstrom et al. | 165—35 |

ROBERT A. O'LEARY, *Primary Examiner.*

CHARLES SUKALO, *Examiner.*